United States Patent
Yamamiya et al.

(10) Patent No.: US 6,553,023 B1
(45) Date of Patent: Apr. 22, 2003

(54) PERSONAL COMPUTER WITH TRANSMISSION AND RECEPTION HANDSET

(75) Inventors: Koji Yamamiya, Tokyo (JP); Hiroyuki Suzuki, Tokyo (JP)

(73) Assignees: Taiko Electric Works, Ltd., Tokyo (JP); Nippon Telegraph and Telephone Corp., Tokyo (JP)

( * ) Notice: Subject to any disclaimer, the term of this patent is extended or adjusted under 35 U.S.C. 154(b) by 0 days.

(21) Appl. No.: 09/168,955

(22) Filed: Oct. 9, 1998

(51) Int. Cl.[7] .............................................. H04L 12/66
(52) U.S. Cl. ....................................... 370/352; 379/900
(58) Field of Search ........................ 370/465, 351–356, 370/389, 392, 466–469, 463; 379/900, 212, 93.01, 93.05, 93.06, 93.12, 93.22, 93.26, 130, 140, 357, 389, 396, 88.12, 387.01, 387.02, 428.02, 424, 433.01, 447–448

(56) References Cited

U.S. PATENT DOCUMENTS

| | | | | |
|---|---|---|---|---|
| 5,633,920 A | * | 5/1997 | Kikinis et al. | 379/130 |
| 5,742,596 A | * | 4/1998 | Baratz et al. | 370/356 |
| 5,799,067 A | * | 8/1998 | Kikinis et al. | 379/357.04 |
| 5,838,665 A | * | 11/1998 | Kahn et al. | 370/352 |
| 6,047,060 A | * | 4/2000 | Fedorov et al. | 379/93.06 |
| 6,157,620 A | * | 12/2000 | Danne et al. | 379/130 |
| 6,169,734 B1 | * | 1/2001 | Wilson | 370/352 |
| 6,175,565 B1 | * | 1/2001 | McKinnon et al. | 370/354 |

FOREIGN PATENT DOCUMENTS

WO    wo 9818238    *  4/1998 ........... H04L/12/28

OTHER PUBLICATIONS

Williams, IP telephones design and implement issues, Jul. 1998, pp. 1–10.*
Hui, A telephone adapter for internet telephony systems, 1997, pp. 213–221.*

* cited by examiner

Primary Examiner—Steven Nguyen
(74) Attorney, Agent, or Firm—Oliff & Berridge, PLC

(57) ABSTRACT

A personal computer having a convenient handset for transmitting and receiving a call. A handset (20) is connected to a personal computer (10) connected to a communication line. The personal computer (10) outputs audio data, received through the communication line, to the handset (20). The personal computer (10) includes an audio driver (12) to output audio data from the handset (20) to the communication line and a communication port driver (11) to transmit and receive audio data between it and the handset (20). The handset (20) is connected through an RS-232C cable (30) to the personal computer (10). The handset (20) transmits audio data to the personal computer only when a hookswitch (HS) is placed in the off-hook state. The audio driver (12) detects the condition of the hookswitch HS based on the existence of audio data from the handset (20).

7 Claims, 6 Drawing Sheets

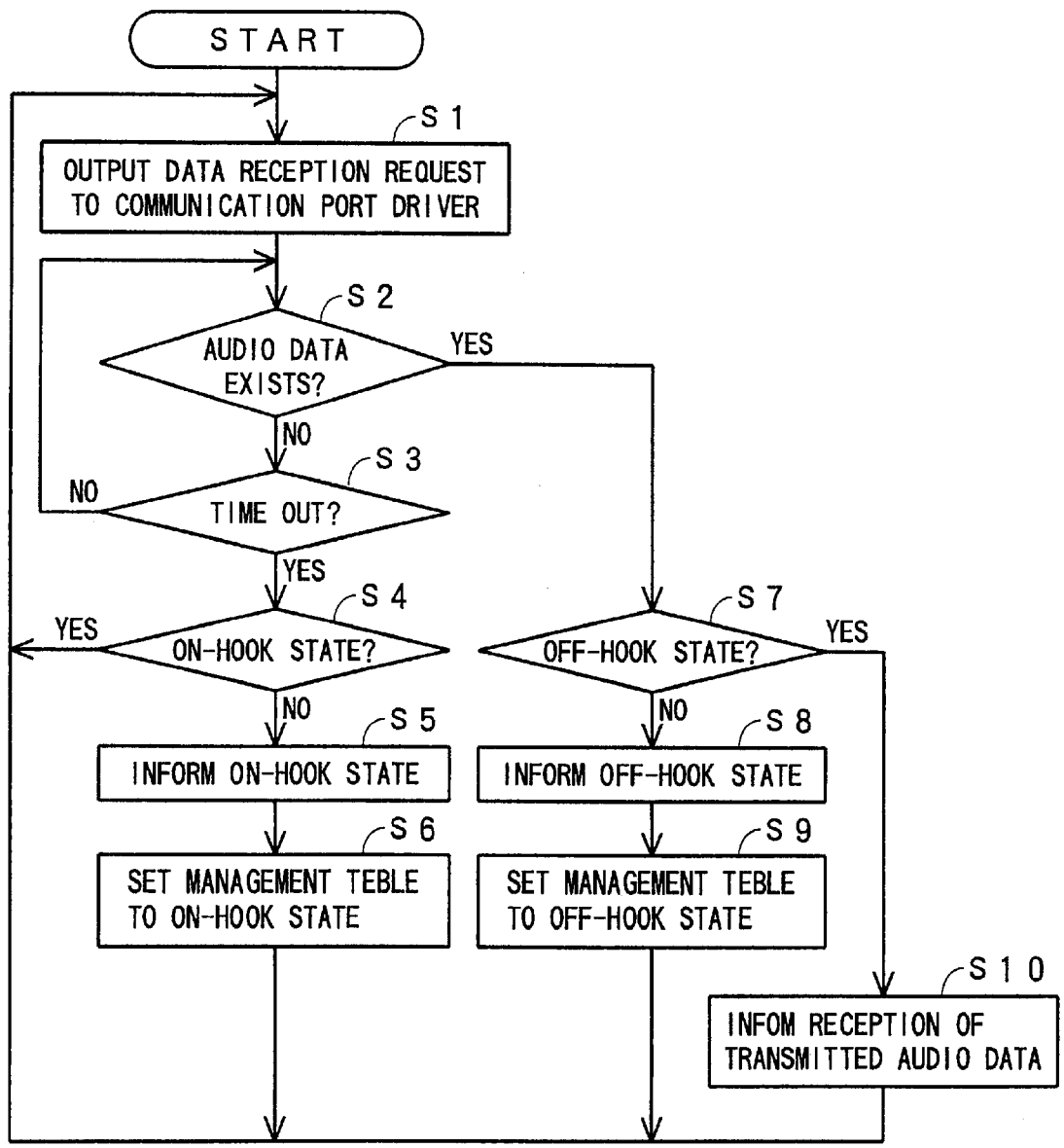
F I G. 6

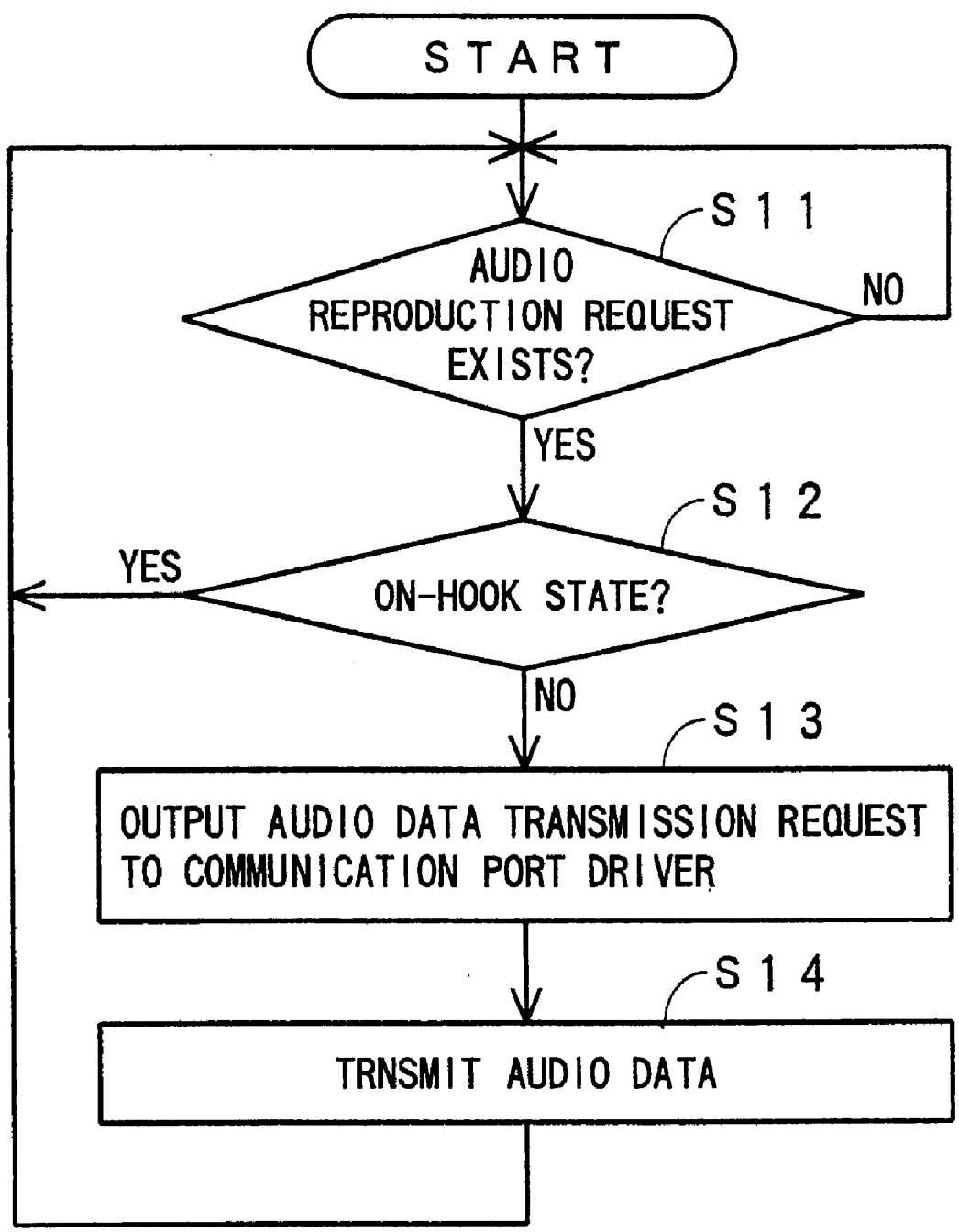
F I G. 7

PERSONAL COMPUTER WITH TRANSMISSION AND RECEPTION HANDSET

BACKGROUND OF THE INVENTION

The present invention relates to a personal computer with a transmission and reception handset.

There have hitherto been widespread network system in which personal computers are connected to a communication line connected to a telephone network or a LAN (local-area network) and data is communicated between the personal computers. A modem (modulator/demodulator) is provided between the communication line and the personal computer in order to enable the personal computers to communicate with each other. The modem is able to modulate transmission data into data of the format that can be transmitted on the communication line and to demodulate modulated reception data transmitted from other personal computer to provide data of the format that can be handled by the personal computer.

Recently, it is considered that operators of personal computers become able to telephone with each other through the communication line. To this end, it is necessary to connect a transmission and reception handset (hereinafter simply referred to as handset) to the personal computer.

As one of systems for connecting the handset to the personal computer, there is considered a method using a sound board. Specifically, a sound board is mounted on the personal computer, and an application for transmitting and receiving data between this personal computer and the handset is installed on the personal computer. Thus, the personal computer receives outgoing call audio data, supplied from a microphone of the handset, from the sound board and transmits this outgoing call audio data to the communication line. Also, the personal computer transmits audio data (incoming call audio data) of the called party, obtained from the communication line, through the sound board to the handset, thereby such incoming call audio data being emanated from a speaker of the handset as sounds.

However, when the handset is connected to the personal computer by the use of the sound board, the personal computer is unable to obtain hookswitch information of the handset from the sound board. As a result, information indicating that the hookswitch of the handset was operated should be entered from a keyboard, for example, instead of hookswitch information from the handset. Thus, the input operation from the keyboard becomes an operation different from the handset on-hook/off-hook, which is habitually familiar to a user when a user makes a telephone call. Therefore, there is then a risk that such personal computer with a handset will become difficult to use.

Further, since one sound board is occupied for making a call, in order to input/output ordinary sounds (e.g. input/output of error sounds and message sounds), it becomes necessary to prepare another sound board. Furthermore, there is a disadvantage that an audio level between the handset and the sound board should be adjusted.

SUMMARY OF THE INVENTION

In view of the aforesaid aspect, it is an object of the present invention to provide a personal computer with a handset in which the above-mentioned shortcomings encountered with the prior art may be overcome.

It is another object of the present invention to provide a personal computer with a handset in which a conversation is made possible by on-hook and off-hook.

According to an aspect of the present invention, there is provided a personal computer in which a transmission and reception handset is connected to a personal computer connected to a communication line. The personal computer is comprised of an audio driver to output audio data, received through the communication line, to the transmission and reception handset and to output audio data from the transmission and reception handset to the communication line, and a first communication interface means connected to the audio driver to transmit and receive data between it and the transmission and reception handset. The transmission and reception handset is comprised of a microphone for collecting sounds of an outgoing call, a speaker for emanating sounds of an incoming call, a second communication interface means for connecting the transmission and reception handset to the first communication interface means of the personal computer, an analog-to-digital conversion means for converting an audio signal from the microphone into a digital signal in such a manner that the digital signal is transmitted to the second communication interface means and converting a digital signal from the second communication means into an analog audio signal in such a manner that the analog audio signal is transmitted to the speaker, and a hookswitch. The personal computer with a transmission and reception handset is characterized in that the transmission and reception handset may transmit data through the second communication interface means to the personal computer only when the hookswitch is placed in the off-hook condition and that the audio driver in the personal computer detects the condition of the hookswitch based on the existence of data transmitted from the transmission and reception handset.

In the above-mentioned arrangement, when the hookswitch of the handset is placed in the off-hook condition, the handset transmits audio data through the second communication interface means to the personal computer.

In the personal computer, audio data transmitted through the first communication interface means from the handset is supplied to the audio driver. When the audio driver detects "existence of data transmitted from the handset" by obtaining this data, the state of the handset is determined that the hookswitch is set in the off-hook condition.

On the other hand, when the condition of the hookswitch of the handset is the on-hook condition, data is not transmitted from the handset through the second communication interface means. As a consequence, the audio driver in the personal computer detects "absence of data transmitted from the handset" and determines that the hookswitch of the handset is placed in the on-hook condition.

Therefore, according to the present invention, without entering a command from the keyboard of the personal computer, it is possible for a user to make a call (to make an outgoing call and to receive an incoming call) through the personal computer by on-hook/off-hook which is the habitual operation of the handset.

BRIEF DESCRIPTION OF THE DRAWINGS

FIG. 6 is a flowchart to which reference will be made in explaining an operation of a main portion according to the embodiment of the present invention;

FIG. 7 is a flowchart to which reference will be made in explaining an operation of a main portion according to the embodiment of the present invention.

DESCRIPTION OF THE PREFERRED EMBODIMENTS

A personal computer with a handset according to embodiments of the present invention will hereinafter be described with reference to the drawings.

Figure 1:
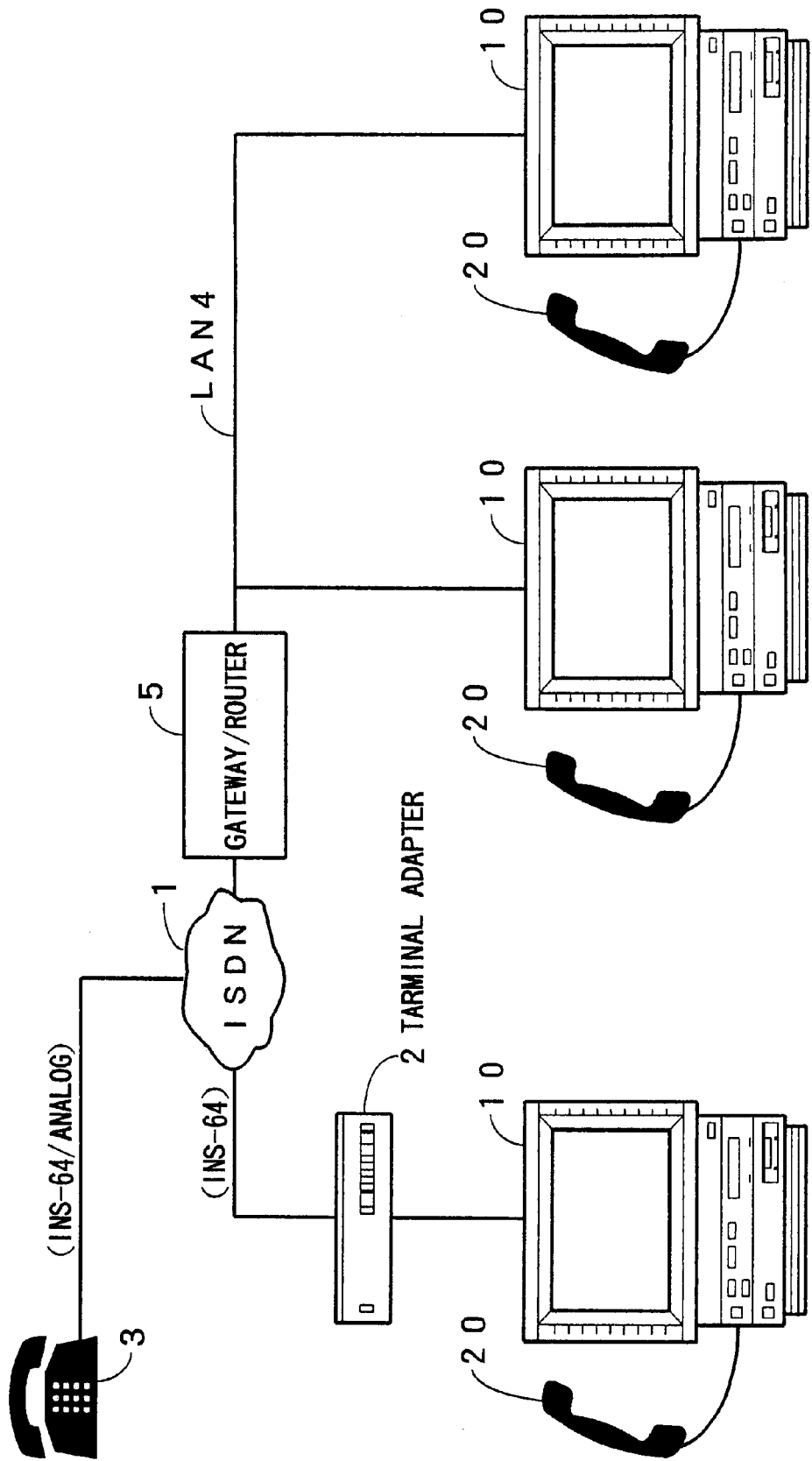
FIG. 1 is a diagram used to explain the manner in which personal computers with handsets are in use.

FIG. 1 of the accompanying drawings shows the manner in which personal computers with handsets according to an embodiment of the present invention are connected on the network. In the embodiment shown in FIG. 1, a plurality of personal computers 10 that are connected to a LAN (local-area network) 4 are connected through a gateway/router 5 to an ISDN (integrated services digital network) 1 and a personal computer 10 is connected through a terminal adapter 2 to the ISDN 1. Each of the personal computers 10 has a handset 20 connected thereto. Although not shown, the personal computer 10 includes a modem (modulator/demodulator) to modulate data that will be transmitted to the ISDN 1 and to demodulate date that was received from the ISDN 1.

Figure 2:
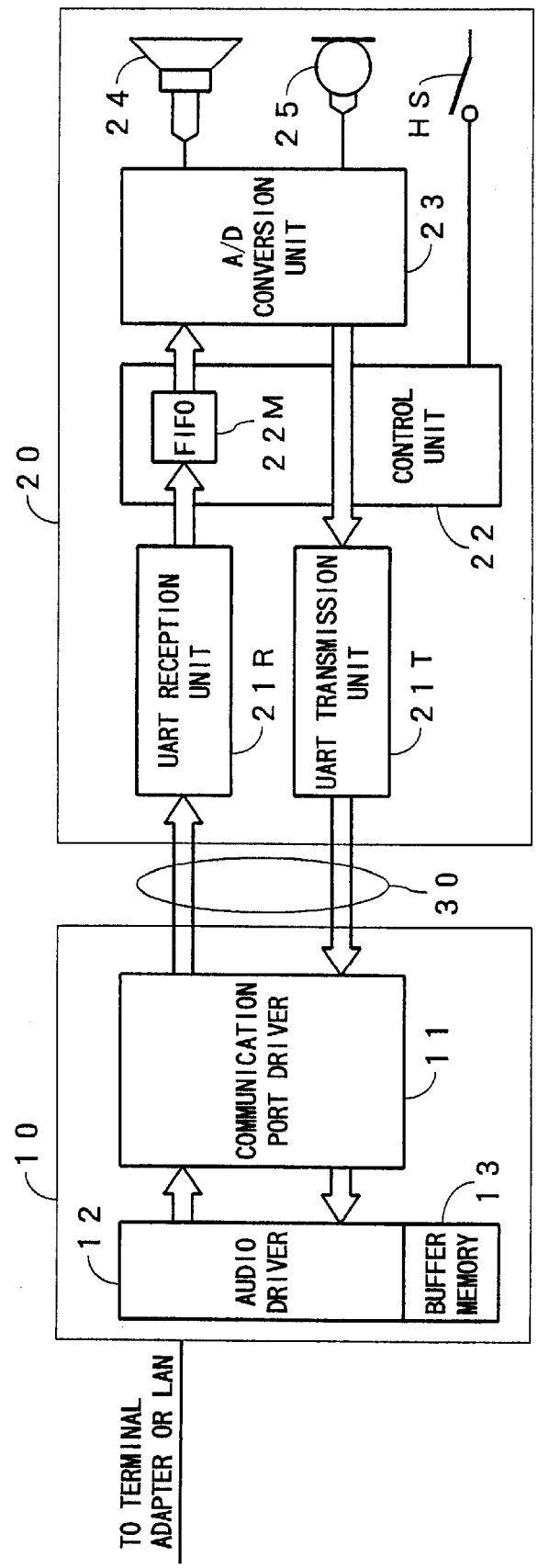
FIG. 2 is a functional block diagram used to explain a main portion of an embodiment according to the present invention.

FIG. 2 is a functional block diagram showing a main portion of the personal computer 10 and the handset 20 according to this embodiment.

As shown in FIG. 2, according to this embodiment, the personal computer 10 and the handset 20 are connected with each other via a serial interface of RS-232C standard. As a start-stop transmission interface device based on this serial interface, according to this embodiment, there is employed a UART (Universal Asynchronous Receiver/Transmitter) which is generally used in a start-stop asynchronous transmission among personal computers.

Specifically, as shown in FIG. 2, the personal computer 10 and the handset 20 are connected with each other through an RS-232C standard cable 30. The personal computer 10 side is provided with a communication port driver 11 for this RS-232C standard cable 30. This communication port driver 11 is connected to an audio driver 12. The audio driver 12 includes a buffer memory 13 serving as a local storage.

The communication port driver 11 processes an input/output request to and from the high-order communication port (RS-232C) and processes the transmission and reception of data to and from the communication port by controlling the hardware.

The audio driver 12 outputs audio data, that was received through a communication network such as LAN and ISDN, or audio data that was stored in the buffer memory 13, via the communication port driver 11 to the handset 20. The audio driver 12 outputs audio data, that was inputted from the handset 20, to the communication network or the communication line or records such inputted audio data on the buffer memory 13. In actual practice, when the audio driver 12 outputs audio data to the handset 20, the audio driver 12 issues a transmission request to the communication port driver 11 beforehand. When the audio driver 12 receives audio data from the handset 20, the audio driver 12 outputs a data reception request to the communication port driver 11 beforehand.

Further, the audio driver 12 has a function to determine and manage the state of the hookswitch of the handset 20 based on the judged result of the existence of incoming data from the handset 20, as will be described later on.

On the other hand, as shown in FIG. 2, the handset 20 includes a UART reception unit 21R and a UART transmission unit 21T connected to the RS-232C standard cable 30. Then, an output terminal of the UART reception unit 21R and an input terminal of the UART transmission unit 21T are connected to a control unit 22. Further, the handset 20 includes a speaker 24 for emanating received sounds and a microphone 25 for collecting transmitted sounds. The handset 20 further includes an analog-to-digital (A/D) conversion unit 23 connected among the speaker 24, the microphone 25 and the control unit 22.

The UART reception unit 21R receives audio data from a communication port (RS-232C), not shown, and the UART transmission unit 21T transmits audio data to a communication port (RS-232C), not shown.

The control unit 22 includes an FIFO (first-in first-out) memory 22M to absorb a time fluctuation by writing audio data, that was received from the UART reception unit 21R, in the FIFO memory 22M. The control unit 22 regularly reads out audio data from this FIFO memory 22M and outputs the audio data thus read out to the A/D conversion unit 23. Also, the control unit 22 regularly receives incoming data, that was inputted from the A/D conversion unit 23, and outputs the audio data thus received to the UART transmission unit 21T.

The A/D conversion unit 23 converts digital audio data from the control unit 22 into an analog audio signal, and outputs this analog audio signal to the speaker 24. Also, the A/D conversion unit 23 converts an analog audio signal inputted from the microphone 25 into digital audio data, and outputs this digital audio data to the control unit 22.

In the case of this embodiment, a hookswitch HS of the handset 20 is connected to the control unit 22. When this hookswitch HS is placed in the on-hook condition, the control unit 22 stops the above-mentioned operation. Therefore, when the hookswitch HS is placed in the on-hook condition, the control unit 22 does not transmit audio data to the UART transmission unit 21T. Then, only when the hookswitch HS is placed in the off-hook condition, the control unit 22 transmits audio data through the UART transmission unit 21T to the personal computer 10.

Figure 3:
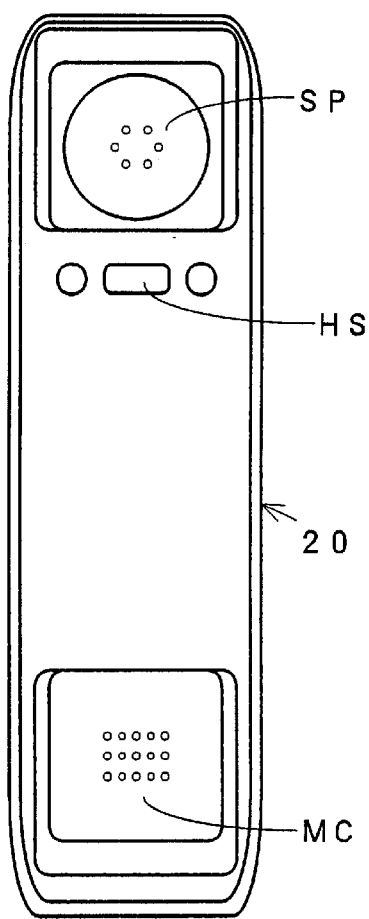
FIG. 3 is a front view showing an outward appearance of a handset according to the embodiment of the present invention.
Figure 4:
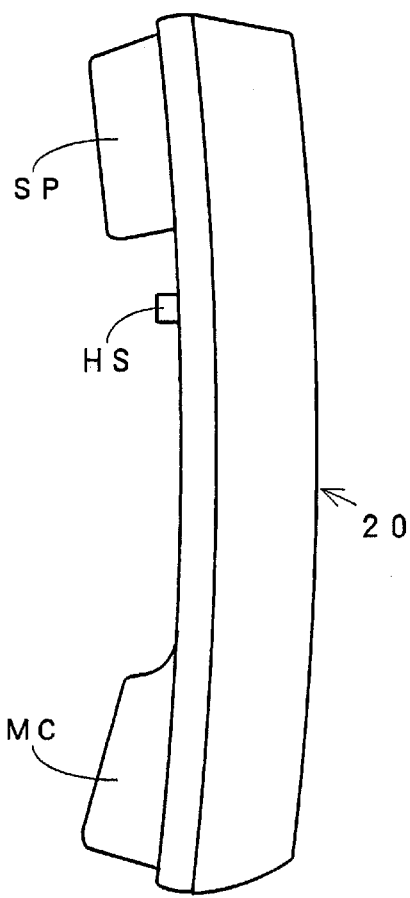
FIG. 4 is a side view showing an outward appearance of a handset according to the embodiment of the present invention.
Figure 5:
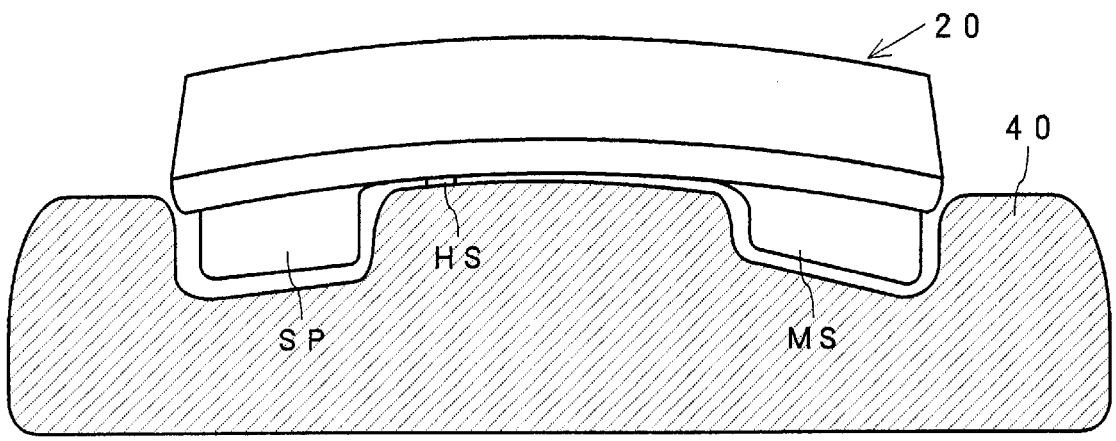
FIG. 5 is a side view showing an outward appearance of a handset which is placed on a cradle according to the embodiment of the present invention.

In the case of this embodiment, as shown in FIGS. 3 and 4, the hookswitch HS is mounted on the housing of the handset 20. When a user takes up the handset 20 from a cradle 40, which is shown in FIG. 5, the hookswitch HS is placed in the off-hook condition. When a user puts down the handset 20 onto the cradle 40, the hookswitch HS is placed in the on-hook condition. That is, the hookswitch HS is placed in the on-hook condition and the off-hook condition in the same manner in which a user operates a handset of an ordinary telephone set. In FIGS. 3,4 and 5, reference letter SP depicts a portion in which the speaker 24 is attached, and MC depicts a portion in which the microphone 25 is attached.

In the above-mentioned arrangement, the audio driver 12 of the personal computer 10 judges the condition of the hookswitch HS of the handset 20 based on the existence of incoming data from the handset 20.

FIG. 6 is a flowchart to which reference will be made in explaining the processing effected when the audio driver 12 of the personal computer 10 receives data from the handset 20. The processing shown in FIG. 6 contains the judgment of the condition of the hookswitch HS of the handset 20 and the management of the hookswitch HS of the handset 20.

Referring to FIG. 6 and following the start of operation, the audio driver 12 outputs a data reception request to the communication port driver 11 at a step S1. When the communication port driver 11 receives this data reception request from the audio driver 12, if there is reception audio data from the communication port (RS-232C), then the communication port driver 11 transmits the reception audio data to the audio driver 12.

At that time, if the hookswitch HS of the handset 20 is placed in the on-hook condition, then the control unit 22 is disabled as mentioned before so that there exists no transmission audio data from the UART transmission unit 21T. If on the other hand the hookswitch HS is placed in the off-hook condition, then the control unit 22 is made operable as mentioned before so that audio data collected by the microphone 25 is transmitted from the UART transmission unit 21T to the personal computer 10.

Therefore, when the audio driver 12 of the personal computer 10 detects audio data from the handset 20, it is determined by the audio driver 12 that the handset 20 is placed in the off-hook condition. When on the other hand the audio driver 12 in the personal computer 10 does not detect audio data from the handset 20, it is determined by the audio driver 12 that the handset 20 is placed in the off-hook state.

Specifically, after the audio driver 12 outputted the data reception request to the communication port driver 11, control goes to the next decision step S2, whereat it is determined by the audio driver 12 whether or not audio data is transmitted from the handset 20. If audio data is not yet transmitted from the handset 20 as represented by a NO at the decision step S2, then control goes to the next decision step S3. In the decision step S3, it is determined by the audio driver 12 whether or not the absence of audio data lasts longer than a previously-determined constant time. If the absence of audio data lasts longer than the above-mentioned predetermined time as represented by a YES at the decision step S3, then it is determined that the condition of the handset 20 is the on-hook condition, and control goes to the next decision step S4. If a NO is outputted at the decision step S3, then control goes back to the step S2, and the steps S2 and S3 are repeated. In the decision step S4, in the management table of the condition of the hookswitch HS of the handset 20, it is determined by the audio driver 12 whether or not the present state is set to the on-hook condition. If the present state is set to the on-hook state as represented by a YES at the decision step S4, then control goes back to the step S1, and the step S1 and the following steps will be repeated.

In the above-mentioned management table, if the present state is not the on-hook state as represented by a NO at the decision step S4, then control goes to a step S5, whereat the on-hook state of the handset 20 is informed to an application which executes a communication. Then, control goes to a step S6, whereat the above-mentioned management table is set to the on-hook state.

If it is determined at the decision step S2 by the audio driver 12 that audio data is transmitted from the handset 20, then it is determined that the present state is the off-hook state, and control goes to the next decision step S7. At the decision step S7, in the management table of the condition of the hookswitch HS of the handset 20, it is determined by the audio driver 12 whether or not the present state is the off-hook state. If the present state is not the off-hook state as represented by a NO at the decision step S7, then control goes to a step S8, whereat the off-hook state is informed to the application which executes a communication. Then, control goes to a step S9, whereat the management table is set to the off-hook state.

If on the other hand the present state is the off-hook state as represented by a YES at the decision step S7, then control goes to a step S10, whereat a reception of transmitted audio data is informed to the application which executes the communication. The audio data thus received is temporarily stored in the buffer memory 13 if necessary.

The processing for receiving audio data from the handset 20 in the personal computer, i.e. transmission processing routine in a telephone call has been described so far. The reception processing routine in the telephone call becomes the transmission processing for transmitting audio data to the handset 20. A processing routine executed in the audio driver 12 when audio data is transmitted to the handset 20 is shown in a flowchart of FIG. 7.

When the application which executes the communication obtains audio data from the party being called, the reception of such audio data is informed to the audio driver 12 and the audio driver 12 issues a sound reproduction request. Referring to FIG. 7 and following the start of operation, initially, it is determined at the decision step S11 by the audio driver 12 whether or not the sound reproduction request is generated.

If the sound reproduction request is generated as represented by a YES at the decision step S11, then control goes to the next decision step S12. If the sound reproduction request is not generated as represented by a NO at the decision step S11, then the decision step S11 will be repeated until it is determined that the sound reproduction request is generated. In the decision step S12, in the management table of the hookswitch HS of the handset 20, it is determined by the audio driver 12 whether or not the present state is the on-hook state. If the present state is the on-hook state as represented by a YES at the decision step S12, then control goes back to the decision step S11.

At the decision step S12, in the above-mentioned management table, if the present state is not the on-hook state as represented by a NO at the decision step S12, then control goes to a step S13, whereat an audio data transmission request is outputted to the communication port driver 11. Then, control goes to the next step S14, whereat audio data is transmitted. Thereafter, control goes back to the decision step S11, and the following steps will be repeated.

The reception processing routine and the transmission processing routine that had been executed so far in the audio driver 12 are respectively activated at a constant time interval, for example, and regularly repeated.

When a user makes the off-hook operation by taking up the handset 20 from the cradle 40 in the above-mentioned manner, the personal computer 10 automatically detects the off-hook condition of the handset 20 as described above. Then, the personal computer 10 transmits and receives audio data (digital signal) between it and the handset 20, that was placed in the off-hook state, through the RS-232C cable 30. Also, the personal computer 10 transmits and receives an audio signal for telephone call between it and other personal computer 10 through the terminal adapter 2 from the ISDN 1 or transmits and receives an audio signal for telephone call between it and other personal computer 10 or the telephone set 3 on the LAN 4 and through the gateway/router 5 from the ISDN 1.

Therefore, a user becomes able to make a call in the same manner as to operate a handset of a telephone set without doing a cumbersome operation such as entering off-hook information from the keyboard of the personal computer 10, which is very convenient for the user.

Further, since the personal computer and the handset are connected via a general-purpose communication interface that personal computers generally equip according to the standard, such communication interface need not be mounted on the personal computer unlike the prior art in which a sound board is used. There is then achieved the effects in which the handset may be connected to the personal computer with ease. Furthermore, since the audio signal is transmitted and received between the personal computer and the handset in the form of the digital signal, a sound level need not be adjusted unlike the prior art in which the sound board is used.

Another embodiment of the present invention will be described below.

Figure 8:
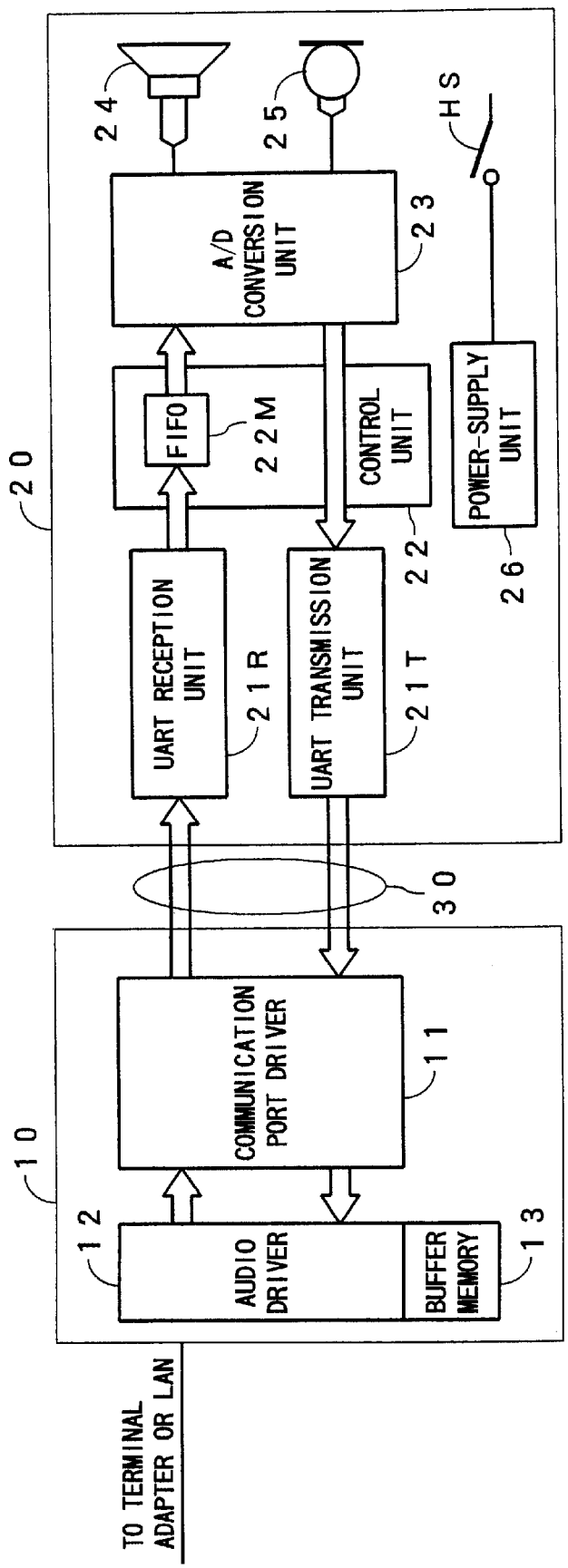
FIG. 8 is a functional block diagram used to explain a main portion of another embodiment according to the present invention.

While the hookswitch HS is connected to the control unit 22 as described above, the present invention is not limited thereto, and the hookswitch HS may be connected to a power-supply unit 26 of the handset 20 as shown in FIG. 8. This hookswitch HS may be served also as a power-supply switch.

In the case of this embodiment, upon off-hook in which a user takes up the handset 20 from the cradle 40, the hookswitch HS is turned on and the power-supply unit 26 is activated. Then, each portion of the handset 20 including the control unit 22 is energized and the handset 20 is made operable. Accordingly, similarly to the above-mentioned embodiment, audio data is transmitted from the control unit 22 to the UART transmission unit 21T.

Therefore, the personal computer 10 side of exactly the same arrangement as that of the aforementioned embodiment is able to detect the condition of the hookswitch HS of the handset 20 by the similar processing and operation with exactly the same action and effects being achieved.

As set forth above, according to the present invention, it is possible to provide a useful personal computer with a handset in which a call may be made by habitual on-hook/off-hook of the handset.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. In a personal computer with a transmission and reception handset connected to said personal computer, said personal computer comprising:

a communication line connected to said personal computer;

an audio driver to output audio data, received through said communication line, to said transmission and reception handset and to output audio data from said transmission and reception handset to said communication line; and first communication interface means connected to said audio driver to transmit and receive data between the first communication means and said transmission and reception handset;

said transmission and reception handset comprising:

a microphone for collecting sounds of an outgoing call;

a speaker for emanating sounds of an incoming call;

second communication interface means for connecting said transmission and reception handset to said first communication interface means of said personal computer;

an analog-to-digital conversion means for converting an audio signal from said microphone into a digital signal in such a manner that said digital signal is transmitted to said second communication interface means and converting a digital signal from said second communication means into an analog audio signal in such a manner that said analog audio signal is transmitted to said speaker; and a hookswitch, said personal computer with a transmission and reception handset characterized in that said transmission and reception handset may transmit data through said second communication interface means to said personal computer only when said hookswitch is placed in an off-hook condition, wherein said hookswitch is determined to be in the off-hook condition when said audio driver in said personal computer detects audio data being transmitted from said transmission and reception handset and said hookswitch is determined to be in the on-hook condition when no audio data is detected by said audio driver, said audio driver repeatedly detecting the condition of said hookswitch at a previously determined rate.

2. A personal computer with a transmission and reception handset as claimed in claim 1, wherein said hookswitch of said transmission and reception handset is provided in a power-supply circuit of said transmission and reception handset and said power-supply circuit is activated when said hookswitch is set to the off-hook condition.

3. A personal computer with a transmission and reception handset as claimed in claim 1, wherein said transmission and reception handset includes a control unit for detecting the condition of said hookswitch and said control unit transmits audio data supplied from said analog-to-digital conversion unit through said second communication interface means to said personal computer only when said off-hook condition of said hookswitch is detected.

4. A personal computer with a handset as claimed in claim 1, wherein said hookswitch of said transmission and reception handset is placed in the on-hook condition under the condition that said transmission and reception handset is placed on a cradle and placed in the off-hook condition when said transmission and reception handset is lifted from said cradle.

5. A personal computer with a handset as claimed in claim 1, wherein said personal computer and said transmission and reception handset are connected with each other via a communication line of RS-232C standard interface.

6. A personal computer with a handset as claimed in claim 5, wherein said interface device of RS-232C standard might be a UART (universal asynchronous receiver/transmitter).

7. A personal computer with a handset as claimed in claim 1, wherein said audio driver in said personal computer repeatedly detects the condition of said hookswitch based on the existence of data transmitted from said transmission and reception handset at a previously-determined constant period.

* * * * *